(12) United States Patent
Rademacher et al.

(10) Patent No.: US 6,596,798 B1
(45) Date of Patent: Jul. 22, 2003

(54) PREPARATION OF LOW HYSTERESIS RUBBER BY REACTING A LITHIUM POLYMER WITH OXAZOLINE COMPOUNDS

(75) Inventors: Christine M. Rademacher, Akron, OH (US); William L. Hergenrother, Akron, OH (US); Daniel F. Graves, Canal Fulton, OH (US); James D. Ulmer, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 72 days.

(21) Appl. No.: 10/012,842

(22) Filed: Nov. 5, 2001

(51) Int. Cl.$^7$ .................................................. C08K 5/06
(52) U.S. Cl. ..................... 524/372; 524/373; 524/374; 524/375; 525/332.8; 525/332.9; 525/333.1; 525/333.2; 526/83; 526/337; 526/339; 526/340
(58) Field of Search ................................. 524/572, 573, 524/574, 575; 526/83, 337, 339, 340; 525/332.8, 332.9, 333.1, 333.2

(56) References Cited

U.S. PATENT DOCUMENTS

| 4,429,091 A | 1/1984 | Hall | 526/181 |
|---|---|---|---|
| 4,695,608 A * | 9/1987 | Engler et al. | 525/308 |
| 5,700,888 A * | 12/1997 | Hall | 526/190 |
| 6,451,935 B1 * | 9/2002 | Schreffler et al. | 526/123.1 |

OTHER PUBLICATIONS

"Oxazoline Ring–Opening," *J. Org. Chem.*, 15, 802–6 (1950).
"Preparation of Functionalized Oxazolines," *Synthetic Communications*, 22(17), 2543–2554 (1992).
"The Chemistry of Oxazolines," *Chemical Reviews*, v44, 447–476 (1949.
"Oxazolines, Their Preparation, Reactions, and Applications," *Chemical Reviews*, v71, 483–505 (1971.

* cited by examiner

*Primary Examiner*—Bernard Lipman
(74) *Attorney, Agent, or Firm*—Meredith E. Palmer; Rodney L. Skoglund

(57) ABSTRACT

The present invention provides a method of forming a functionalized polymer. The method includes the steps of providing a living lithium polymer and terminating the polymer with an oxazoline compound selected from an organic halide oxazoline and a branched or unbranched vinyl oxazoline compound. The present invention also provides a compounded rubber article wherein carbon black is compounded with a terminated rubber that is the reaction product of a living lithium polymer and such oxazoline compounds.

14 Claims, 1 Drawing Sheet

Reaction Scheme (XI)

PREPARATION OF LOW HYSTERESIS RUBBER BY REACTING A LITHIUM POLYMER WITH OXAZOLINE COMPOUNDS

BACKGROUND OF THE INVENTION

The present invention generally relates to the preparation of low hysteresis rubber.

The hysteresis of an elastomer refers to the difference between the energy applied to deform the elastomer and the energy recovered as the elastomer returns to its initial, undeformed state. In many industries, it is often desirable to produce elastomeric compounds exhibiting reduced hysteresis when properly compounded with other ingredients, such as reinforcing agents, and then vulcanized. Such elastomers, when compounded, fabricated, and vulcanized into components for constructing articles such as tires, power belts, and the like, will manifest properties of increased rebound and reduced heat build-up when subjected to mechanical stress during normal use. In pneumatic tires, lowered hysteresis properties are associated with reduced rolling resistance and heat build-up during operation of the tire. As a result, lower fuel consumption is realized in vehicles using such pneumatic tires.

Compounded elastomer systems are known in the art and are comprised of at least one elastomer, a reinforcing filler agent (such as carbon black or mineral fillers such as clay, silica, and the like), and a vulcanizing system. Notably, interaction between the elastomer molecules and the reinforcing filler agent(s) is known to affect hysteresis.

It has been recognized that hysteresis and other physical properties of compounded elastomer systems can be improved by ensuring good dispersion of carbon black throughout the elastomer component. In particular, it has been recognized that individual carbon black aggregates should be well dispersed in order to minimize the contact between them. By preparing elastomers with end groups capable of interacting with reinforcing fillers such as carbon black, dispersion of individual carbon black aggregates is stabilized, reducing interaggregate contacts and thereby reducing hysteresis. Thus, increased interaction between elastomer chain ends and reinforcing fillers will tend to decrease hysteretic losses.

Thus, there exists a need in the art for increasing interaction between elastomer molecules and reinforcing fillers within a compounded elastomer system. More particularly, there exists a need in the art for a terminator that provides elastomer molecules with end groups that interact with the functionality of carbon black and other reinforcing fillers. There also exists a need in the art for a process for terminating polymers with such desired end groups.

SUMMARY OF THE INVENTION

In the present invention, lithium-initiated polymers are terminated with oxazoline compounds. Useful oxazoline compounds may be selected from organic halide oxazoline compounds and branched or unbranched vinyl oxazoline compounds.

When organic halide oxazoline compounds are employed, the carbon-lithium chain end of the propagating polymer reacts with the halide provided by the oxazoline compound, and the polymer is terminated with the organic oxazoline.

When a branched or unbranched vinyl oxazoline compound is employed, the vinyl oxazoline compound is inserted between the propagating polymer and the lithium atom, thereby effectively terminating further polymer propagation with chemical units other than vinyl oxazoline compounds or, more broadly, monomers that will polymerize with a substituted acrylate anion, such as, for example, esters of methacrylic acid, acrylic acid, cyanoacrylic acid and the like.

The oxazoline ring of these terminators interacts with carbon black, and the resulting functional polymers therefore exhibit reduced hysteresis in cured, compounded rubber, when compared to unterminated, yet otherwise identical, controls.

Generally, the present invention provides a method of forming an oxazoline functionalized polymer. The method includes the steps of forming a solution of one or more anionically polymerizable monomers in an alkane solvent, and polymerizing the monomers in the presence of a lithio-containing initiator so as to produce a living lithium polymer as is known in the art. The living lithium polymer is then terminated with an oxazoline compound according to the formula (I):

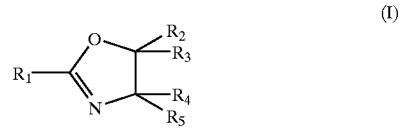

wherein $R_1$ to $R_5$ are selected according to the following criteria:

$R_1$ is selected from the group consisting of:
an organic halide according to the following formula (II):

wherein each $R_6$ may be the same or different and is selected from the group consisting of a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, $R_7$ is selected from the group consisting of a branched or linear $C_1$–$C_{20}$ alkylene moiety, a $C_4$–$C_{20}$ cycloalkylene moiety, and a $C_6$–$C_{20}$ alkylarylene moiety, and X is a halogen;

a branched or unbranched vinyl moiety according to the following formula (III):

wherein $R_8$ is selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety;

a moiety according to formula (IV):

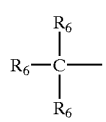

(IV)

wherein each $R_6$ may be the same or different and is selected according to the same criteria set forth in formula (II); and hydrogen; and $R_2$–$R_5$ may be the same or different and are selected from the group consisting of:
hydrogen;
an organic halide, —$R_7$—X, wherein $R_7$ is as already defined, and X is a halogen; and
a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, with the proviso that if $R_1$ is selected from either an organic halide according to formula (II) or a vinyl moiety according to formula (III), $R_2$–$R_5$ are selected from hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety; and if $R_1$ is selected from either hydrogen or a moiety according to formula (IV), one of $R_2$–$R_5$ is selected from an organic halide, —$R_7$—X, the other $R_2$–$R_5$ groups are selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety.

The present invention also provides compounds according to the following formula:

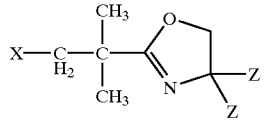

wherein X is a halogen, and each Z is the same and is selected from the group consisting of hydrogen and a methyl group.

As mentioned, it has been found that the oxazoline ring of the terminators disclosed herein beneficially interact with carbon black to reduce hysteresis in rubbers compounded with carbon black. Thus, the present invention also provides a method for producing a tire having reduced hysteresis. This method includes terminating a lithium-initiated rubber with an oxazoline compound; and compounding the oxazoline-terminated rubber with carbon black, wherein the oxazoline compound employed to terminate the lithium-initiated rubber is selected according to formula (I) under the criteria as set forth above with respect to formula (I).

PREFERRED EMBODIMENT OF THE INVENTION

Figure 1:
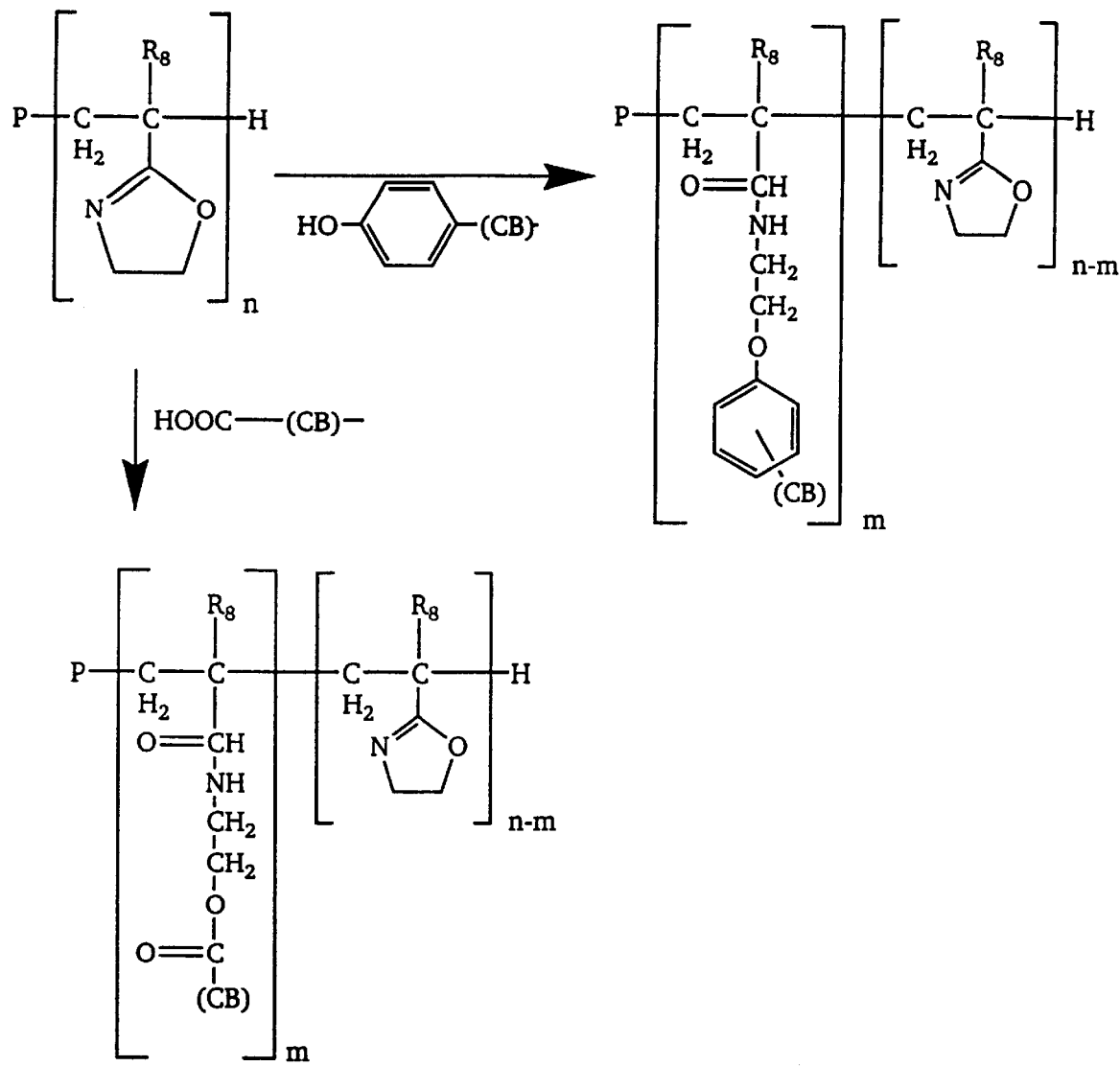
FIG. 1 provides a chemical reaction mechanism (XI), which shows the interaction of carbon black with a block polymer produced with a vinyl oxazoline compound according to the present invention.

As will become apparent from the description that follows, the present invention provides oxazoline-terminated polymers and a method for producing such polymers. The oxazoline-terminated polymers are formed from living lithium polymers resulting from anionic polymerization techniques utilizing lithio-containing initiators. It has been found that living polymers terminated with oxazoline compounds according to the present invention provide compositions demonstrating improved hysteresis when compounded with carbon black and thereafter cured or vulcanized.

The terminators disclosed herein are oxazoline compounds. Specifically, the terminators of the present invention are defined by formula (I):

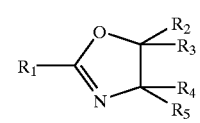

(I)

wherein $R_1$ through $R_5$ are selected so as to provide either an organic halide oxazoline compound or a branched or unbranched vinyl oxazoline compound according to criteria as set forth below.

Organic halide oxazoline compounds of this invention may be provided by selecting $R_1$ to be an organic halide moiety according to formula (II):

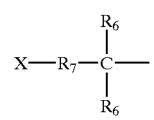

(II)

wherein each $R_6$ may be the same or different and is selected from the group consisting of a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylarylene moiety, $R_7$ is selected from the group consisting of a branched or linear $C_1$–$C_{20}$ alkylene moiety, a $C_4$–$C_{20}$ cycloalkylene moiety, and a $C_6$–$C_{20}$ alkylarylene moiety, and X is a halogen. Other organic halide oxazoline compounds of this invention may be provided by selecting any one of $R_2$ through $R_5$ to be an organic halide moiety, —$R_7$—X, wherein $R_7$ is as already defined, and X is a halogen. However, only one of $R_2$ through $R_5$ is to be selected from such organic halides.

If $R_1$ is selected according to formula (II), $R_2$–$R_5$ are the same or different and are selected from hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety.

If one of $R_2$–$R_5$ is selected according to the organic halide —$R_7$—X, the other of $R_2$–$R_5$ are selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety and a $C_7$–$C_{20}$ alkryl moiety, and $R_1$ is selected from hydrogen or a moiety according to formula (IV):

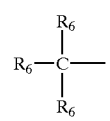

(IV)

wherein each $R_6$ may be the same or different and is selected according to the same criteria set forth in formula (II).

Some non-limiting examples of the above-defined organic halide oxazoline terminators include 2-(1,1-dimethyl-2- chloroethyl)-2-oxazoline and 2-(1,1-dimethyl-2-chloroethyl)-4,4-dimethyl-2-oxazoline, represented by the following formulae (i) and (ii), respectively:

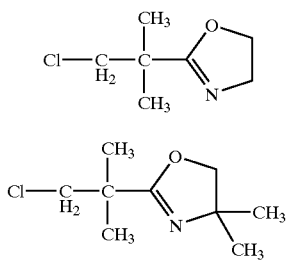

The branched or unbranched vinyl oxazoline compounds of this invention may by provided by selecting $R_1$, in formula (I), to be a branched or unbranched vinyl group according to formula (III):

wherein $R_8$ is selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety. If $R_1$ is such a vinyl group, $R_2$–$R_5$ are the same or different and are selected from hydrogen, a branched or linear $C_1$–$C_{20}$ alkyl moiety, a $C_3$–$C_{20}$ cycloalkyl moiety, a $C_6$–$C_{20}$ aryl moiety and a $C_7$–$C_{20}$ alkrylaryl moiety.

A non-limiting example of an above-defined vinyl oxazoline terminator is 2-isopropenyl-2-oxazoline (IPO) represented by the following formula (iii):

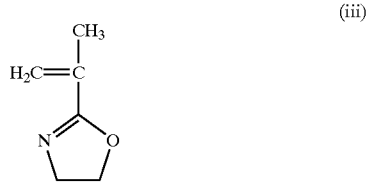

The terminators according to the present invention can be formed by any number of techniques as may be known in the art. The means of preparing the oxazoline terminators is not germane to the procedural aspects of the present invention, and, therefore, this invention is not to be limited thereto or thereby. For a more detailed discussion on the preparation of the oxazoline terminators reference may be made to Brenton et al., "Preparation of Functionalized Oxazolines," *Synthetic Communications*, 22(17), 2543–2554 (1992); Wiley et al., "The Chemistry of Oxazolines," *Chemical Reviews*, v44, 447–476 (1949); and Frump, John A., "Oxazolines, Their Preparation, Reactions, and Applications," *Chemical Reviews*, v71, 483–505 (1971), the disclosures of which are incorporated herein by reference.

One method for preparing organic halide oxazoline compounds according to this invention involves reacting an acid chloride with 2-amino ethanol to obtain an amide with a 2-hydroxy ethyl group extending off of the nitrogen. The alcohol functionality (OH) is then converted to a good leaving group (such as halogens or tosylates), and this resultant intermediate is treated with a base, such as hydroxide, to form the oxazoline ring. Such a procedure is more fully set forth in the experimental section below.

Terminators according to the disclosure hereinabove are employed to functionalize living polymers, particularly living lithium polymers, to produce vulcanizable elastomer compositions that exhibit reduced tan δ, after isolation and compounding with carbon black, when compared to unterminated, yet otherwise identical, control polymers. Herein, a "living polymer" is to be understood as a polymeric segment having a living or reactive end. For example, when a lithio-containing initiator is employed to initiate the formation of such a polymer, the reaction will produce a reactive polymer having a lithium atom at the living or reactive end thereof.

Living polymers functionalized with organic halide oxazoline compounds according to the present invention will contain an oxazoline-functional unit incorporated at the terminus of the polymer. Living polymers functionalized with branched or unbranched vinyl oxazoline compounds according to the present invention will still contain a lithium atom at the terminus of the polymer until quenching; however, one or more of the vinyl oxazoline compounds will be inserted between the lithium atom and the polymer's main chain. Functionalization with vinyl oxazoline compounds therefore produces a polymer having a plurality of oxazoline-functional units incorporated at the terminal end in the form of a block polymer having at least one block defined by the elastomeric rubber and another block defined by at least one vinyl oxazoline group. Despite this aspect, living polymers functionalized with branched or unbranched vinyl oxazoline compounds according to the present invention are still considered oxazoline-terminated polymers inasmuch as the addition of this vinyl oxazoline block ensures that only selective monomers can continue the propagation of the polymer. Such monomers include other vinyl oxazoline compounds and, more broadly, monomers that will polymerize with acrylate-type chain ends, such as esters of methacrylic acid, acrylic acid, cyanoacrylic acid, and the like. Thus, the lithium atom remains present in the resultant oxazoline-blocked polymer. The polymer is still considered to be a living polymer that includes an oxazoline-functional unit derived from the blocking of the oxazoline monomer.

The oxazoline-functional unit, derived from the terminator, will provide the polymer with a moiety that is reactive toward the functionalities of carbon black (i.e., COOH and OH). Thus, mixing these functionalized polymers with carbon black will yield an increase in the amount of carbon black directly bound to the polymer and thereby decrease the hysteresis of the cured rubber stock produced with such a polymer. The resulting oxazoline functionalized polymers are therefore useful for producing such articles as tires, wherein the oxazoline-functional unit can bind to carbon black and serve to reduce hysteresis and tire rolling resistance.

An advantage provided by use of the oxazoline-functionalized polymers of the present invention is that the oxazoline functionality is strongly tethered to the polymer chain and therefore will not likely be separated from the polymer during compounding operations wherein vulcanizable elastomeric compounds are formed. Subsequent to vulcanization, a reduction in hysteresis loss is ensured, since the oxazoline functionality has chemically bonded to the filler. Hysteresis loss reductions, as measured by tan δ at 50° C., of at least about 5 to about 25% and higher may be obtained through practice of the present invention.

A general reaction scheme for functionalizing a living polymer with an organic halide oxazoline of this invention is depicted in reaction scheme (V) below, wherein the organic halide oxazoline is reacted with a living lithium polymer represented by P—Li:

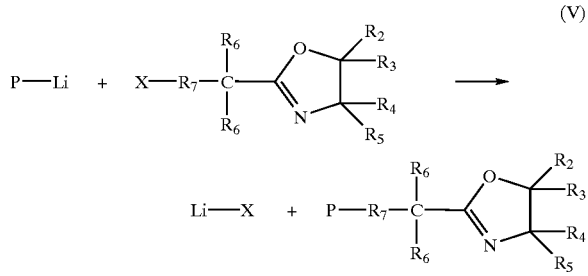

(V)

wherein $R_6$ and $R_7$ are as already defined, $R_2$–$R_5$ are the same or different and are selected from hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, X is a halogen, and P represents a polymeric unit. The polymeric unit "P" may be any anionically-polymerized polymer initiated by lithio-containing initiators. As mentioned, the lithium atom at the propagating end of the lithium polymer is removed by the halide on the organic halide oxazoline terminator, and the polymeric unit is terminated with an organic oxazoline functional end. Notably, this is an exemplary reaction, and those of ordinary skill in the art will readily appreciate the similar reaction that would take place should the organic halide moiety, —$R_7$—X, be provided at one of the $R_2$–$R_5$ positions off of the oxazoline ring.

The general reaction scheme for functionalizing a living polymer with a vinyl oxazoline of this invention is depicted in reaction scheme (VI) below, wherein the vinyl oxazoline is reacted with a lithium polymer, again represented by P—Li:

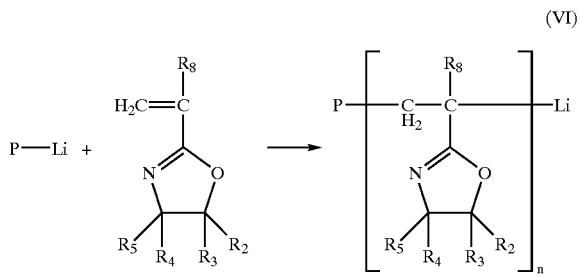

(VI)

wherein $R_8$ is as already defined, $R_2$–$R_5$ are the same or different and are selected from hydrogen, a branched or linear $C_1$–$C_{20}$ alkyl moiety, a $C_3$–$C_{20}$ cycloalkyl moiety, a $C_6$–$C_{20}$ aryl moiety and a $C_7$–$C_{20}$ alkrylaryl moiety, P represents a polymeric unit, and n is a numeral of one or greater, depending upon the amount of vinyl oxazoline employed and the extent of the reaction between the living lithium polymer and the vinyl oxazoline. Preferably, n ranges from 1 to about 100. The polymeric unit "P" may be any anionically-polymerized polymer initiated by lithio-containing initiators. It can be seen that the vinyl oxazoline terminator is inserted between the polymeric unit and the lithium atom. Notably, once the vinyl oxazoline compound has been inserted between the polymeric unit and the lithium atom, only monomers that will polymerize with acrylate chain ends, such as esters of methacrylic acid, acrylic acid, cyanoacrylic acid, and the like can be added to the lithium end of the polymer. Thus, the living elastomeric lithium polymer is deemed to be effectively terminated and, more particularly, a block polymer is produced having a block defined by polymeric unit P and at least one additional block defined by the vinyl oxazoline terminator.

After polymerization is complete, the lithium is removed by quenching with alcohol or water, as known in the art, and is thereby replaced by a hydrogen atom.

It should be appreciated that polymeric unit P can include any anionically-polymerized polymer. Illustrative examples of useful polymers include, but are not limited to homopolymers and copolymers of isoprene and butadiene, such as polyisoprene and polybutadiene and poly(butadiene-isoprene), and, copolymers and terpolymers of styrene, butadiene and isoprene such as poly(styrene-butadiene) (SBR), poly(butadiene-styrene-isoprene) and combinations thereof. A non-limiting example of such a polymer is styrene-butadiene rubber.

It should be understood that the living polymers terminated according to the present invention can be prepared using any known anionic polymerization technique employing lithio-containing initiators. Such initiators can include, but are not limited to, N-lithiohexamethyleneimine, n-butyllithium, tributyl tin lithium, dimethylaminolithium, diethylaminolithium, dipropylaminolithium, dibutylaminolithium, dialkylaminoalkyllithium, such as diethylaminopropyllithium and trialkly stannyl lithium, among others.

Polymerization is typically conducted in a polar or nonpolar solvent, such as tetrahydrofuran (THF), a hydrocarbon solvent, such as the various cyclic and acyclic hexanes, heptanes, octanes, pentanes, their alkylated derivatives, and mixtures thereof. In order to promote randomization in copolymerization and to control vinyl content, a polar modifier may be added to the polymerization ingredients. Amounts range between 0 and 90 or more equivalents per equivalent of lithium. The amount depends on the desired level of 1,2-polybutadiene linkages, the amount of styrene employed, and the temperature of the polymerization, as well as the nature of the specific polar modifier employed. Suitable polymerization modifiers include, for example, ethers or amines to provide the desired microstructure and randomization of a comonomer unit.

Polymers terminated according to the present invention can be of any molecular weight, depending on the intended application. Generally, for purposes of making tire products, the molecular weight of the polymer should fall within the range from about 80,000 to about 300,000 g/mol. Preferably, the molecular weight should fall within the range of from about 100,000 to about 250,000 g/mol, and, most preferably, from about 120,000 to about 200,000 g/mol.

Other compounds useful as polar modifiers are organic and include tetrahydrofuran (THF) and linear and cyclic oligomeric oxolanyl alkanes such as 2,2-bis(2'-tethrahydrofuryl)propane, dipiperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, the subject matter of which relating to such modifiers is incorporated herein by reference. Compounds useful as polar modifiers include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); and the like.

Typically, a batch polymerization is begun by charging one or more anionically polymerizable monomers to a suitable reaction vessel along with an alkane solvent, a polar modifier (if employed), and a lithio-containing initiator as previously described. The reactants are heated to a temperature of from about 20° C. to about 120° C., and the polymerization is allowed to proceed for about 0.1 to about 20 hours. This reaction produces a reactive polymer having a living lithium end (i.e., a living lithium polymer), as is generally known in the art.

An oxazoline compound according to the present invention is added to the reaction vessel, and the vessel is agitated for about 1 to about 60 minutes. As a result, elastomeric compositions functionalized with oxazoline according to this invention are produced, having an even greater affinity for compounding materials, such as carbon black, when compared to non-functional, yet otherwise identical, quenched polymer. The increased affinity for fillers that is realized in the polymers terminated according to this invention leads to an observed reduction in hysteresis. Notably, a small amount of conventional terminators may be employed in conjunction with the oxazolines of this invention, as is known in the art.

The polymer may be separated from the solvent by conventional techniques. Such techniques include steam or alcohol coagulation, thermal desolventization, or any other suitable method. Additionally, solvent may be removed from the resulting polymer by drum drying, extruder drying, vacuum drying, or the like.

The polymers that are terminated according to the present invention comprise a plurality of polymer molecules having a functional group, particularly an oxazoline group, at or near the tail end of the polymer, i.e., the end of the polymer that is terminated. The polymer can have a functional group at both the tail and the head of the polymer, the functional group at the head of the polymer resulting from the proper choice of a functional initiator. Thus, in another embodiment, a polymer is initiated using an initiator that will leave a useful functional group at the head of the polymer, and the polymerization is terminated with a terminator that will leave an oxazoline group at the tail of the polymer. The compounding of such elastomers produces products exhibiting improved filler network stability and reduced hysteresis loss, resulting in products that have increased rebound, decreased rolling resistance, and less heat build-up when subjected to mechanical stress.

A polymer that has been initiated using a functionalized initiator and terminated using an organic halide oxazoline compound according to the present invention can be defined by formula (VII):

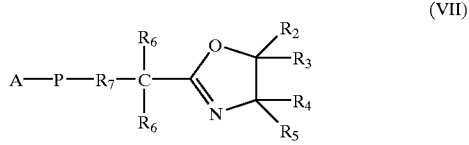

(VII)

wherein $R_2$–$R_5$ are selected from hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety; each $R_6$ may be the same or different and is selected from the group consisting of a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety; $R_7$ is selected from the group consisting of a branched or linear $C_1$–$C_{20}$ alkyl moiety, a $C_4$–$C_{20}$ cycloalkyl moiety, and a $C_7$–$C_{20}$ alkylaryl moiety; A is a functionalized moiety resulting from an initiator; and P is a polymeric unit. Initiators providing functionalized moieties are well known in the art, and the present invention is not to be limited to or by any specific initiator.

A polymer that has been initiated using a funcitonalized initiator and terminated using a branched or unbranched vinyl oxazaline compound according to the present invention can be defined by formula (VIII):

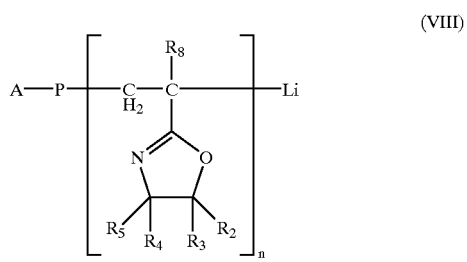

(VIII)

wherein $R_2$–$R_5$ are selected from hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety; $R_8$ is selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety; n is a numeral of one or greater; A is a functionalized moiety resulting from an initiator; and P is a polymeric unit.

The polymers made and terminated according to the teachings of the present invention can be used alone or in combination with other elastomers to prepare a product such as a tire tread stock, sidewall stock, or other tire component stock compound. Such stocks are useful for forming tire components such as treads, subtreads, black sidewalls, body ply skims, bead fillers, and the like. At least one such component is produced from a vulcanizable elastomeric or rubber composition of the invention. For example, they can be blended with any conventionally employed tread stock rubber, which includes natural rubber, synthetic rubber, and blends thereof. Such rubbers are well-known to those skilled in the art and include synthetic polyisoprene rubber, styrene/butadiene rubber (SBR), polybutadiene, butyl rubber, poly (chloroprene), ethylene/propylene diene rubber (EPDM), acrylonitrile/butadiene rubber (NBR), ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, and other functionalized elastomers and the like. When the polymers of the present invention are blended with conventional rubbers, the composition of the blend can vary widely. Preferably, when blended with conventional rubbers, polymers according to the present invention make up from about 1 to about 99 weight % of the blend, and, more preferably, from about 20 to 80 weight %.

The polymers and block polymers bearing oxazoline functionalities according to the present invention are reactive with the functionalities of carbon black such that mixing these oxazoline-terminated polymers with carbon black allows for the direct binding of carbon black to the polymer, and thereby provides a compounded product that exhibits decreased hysteresis.

Polymers terminated with organic halide oxazoline compounds having the organic halide moiety at the $R_1$ position in formula (I) react with carbon black functionalities through the following reaction mechanism (IX):

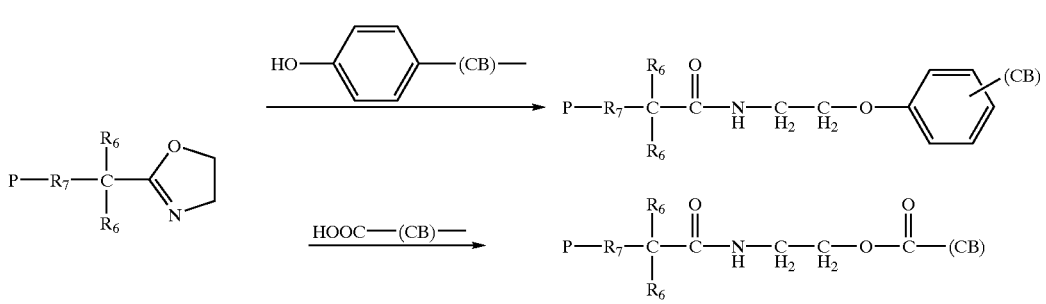

(IX)

wherein (CB) generally represents carbon black and $R_6$ and $R_7$ are as already defined.

Polymers terminated with organic halide oxazoline compounds having the organic halide moiety Y at one of the $R_2$–$R_5$ positions in formula (I) react with carbon black functionalities through the following reaction mechanism (X):

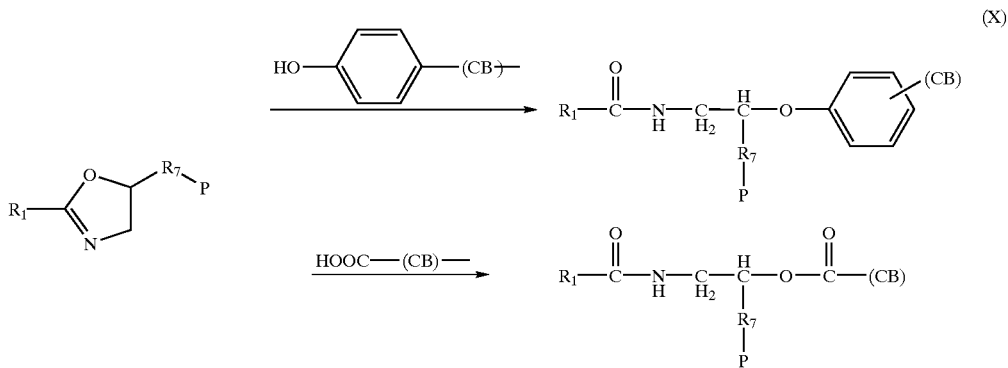

(X)

wherein (CB) generally represents carbon black, $R_1$ is selected from hydrogen or a moiety according to formula (IV), P is a polymer, and $R_7$ exists as a result of the removal of the halogen from the —$R_7$—X; moiety. For purposes of this example, the $R_2$ position of formula (I) provides the organic halide and $R_3$–$R_5$ are hydrogen.

Block polymers produced with branched or unbranched vinyl oxazoline compounds according to the present invention react with carbon black functionalities in accordance with reaction mechanism (XI), which is provided as FIG. 1, wherein (CB) generally represents carbon black, $R_8$ is as already defined, and P is a polymer. It should be appreciated that any number of the oxazoline functionalities within the polymer block defined by "n" might react with carbon black, and, therefore, the letter "m" employed in FIG. 1 is used to designate the number of the vinyl oxazoline functionalities that have reacted. The number of unreacted vinyl oxazoline functionalities is thus designated by "n-m."

The polymers according to the present invention (or blends thereof as mentioned above) can be compounded with carbon black in amounts ranging from about 5 to about 100 parts by weight per 100 parts of rubber (phr). Preferably, carbon black is compounded at about 15 to about 80 phr, most preferably, from about 20 to about 70 phr. The carbon blacks may include any of the commonly available, commercially-produced carbon blacks, but those having a surface area of at least 10 $m^2/g$ and more preferably at least 20 $m^2/g$ up to about 160 $m^2/g$ or higher are preferred.

Surface area values used in this application are those determined by ASTM test D-4820, using the BET nitrogen surface area technique.

Among the useful carbon blacks are furnace black, channel blacks, and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing blacks, and conducting channel blacks. Other carbon blacks which may be the utilized include acetylene blacks. Typical carbon blacks that are used include N110, N121, N220, N231, N242, N293, N299, N326, N330, N332, N339, N343, N347, N351, N358, N375, N472, N539, N472, N539, N550, N660, N683, N754, and N765. Depending on the particular use of the compound, the appropriate carbon black may be selected. Mixtures of two (2) or more of the above blacks can be used in preparing products of this invention.

Vulcanizable elastomeric compositions made from the polymers terminated according to the present invention can be prepared by compounding or mixing the polymers with carbon black and other conventional rubber ingredients, including inorganic fillers, peptizing agents, pigments, stearic acid, antiozonants, processing aids, prevulcanization inhibitors, extender oils, waxes, plasticizers, antioxidants, vulcanizing agents, and the like, using standard rubber mixing equipment and procedures.

The reinforced rubber compounds can be cured in a conventional manner with known vulcanizing agents. Termination of polymers according to the present invention does not appreciably affect cure times and, thus, the polymers can be cured for a conventional amount of time. The reinforced rubber compounds can be cured in a conventional manner with known vulcanizing agents, such as sulfur and accelerators. When a vulcanizing agent is used, the amount of the agent used is 0.1 to 5 parts by weight, preferably 0.1 to 3 parts by weight, based on 100 parts by weight of the rubber material, with a range of from about 0.1 phr to about 2 phr being preferred. Vulcanizing agents may be used alone or in combination. Cured or cross-linked polymers will be referred to as vulcanizates for purposes of this disclosure.

Representative of conventional accelerators are amines, guanidines, thioureas, thiols, thiurams, sulfonamides, dithiocarbamates and xanthates which are typically added in amounts of from about 0.2 to about 10 phr, with a range of from about 2 phr to about 5 phr being preferred. Representative of sulfur vulcanizing agents generally include elemental sulfur (free sulfur) or sulfur donating vulcanizing agents, for example, an amine disulfide, polymeric polysulfide or sulfur olefin adducts. Useful examples include CBS accelerator (N-cyclohexyl-2-benzothiazole sulfenamide), DPG accelerator (diphenyl guanidine) and, for examples in the invention, MBTS accelerator (benzothiazyldisulfide).

Representative of the antidegradants which may be in the rubber composition include monophenols, bisphenols, thiobisphenols, polyphenols, hydroquinone derivatives, phosphates, phosphate blends, thioesters, naphthylamines, diphenol amines as well as other diaryl amine derivatives, paraphenylene diamines, quinolines and blended amines. Antidegradants are generally used in an amount ranging from about 0.1 phr to about 10 phr with a range of from about 0.5 to 6 phr being preferred.

Representative of a peptizing agent that may be used is pentachlorophenol which may be used in an amount ranging from about 0.1 phr to 0.4 phr with a range of from about 0.2 to 0.3 phr being preferred.

Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and resins. These processing oils may be used in a conventional amount ranging from about 0 to about 50 phr with a range of from about 5 to 25 phr being preferred.

Zinc oxide and stearic acid are conventionally used to vulcanize elastomers. Zinc oxide is generally used in a conventional amount ranging from about 0.5 to about 5 phr. Stearic acid is generally used in a conventional amount ranging from about 1 to about 4 phr.

EXPERIMENTAL

In order to demonstrate the practice of the present invention, the following examples have been prepared and tested as described and disclosed hereinbelow. The examples should not, however, be construed as limiting the scope of the invention. The claims will serve to define the invention.

Example I

I: Preparation of Organic Halide Oxazolines 2-(1,1-dimethyl-2-chloroethyl)-2-oxazoline was prepared as follows. Initially, N-(2-hydroxyethyl)-3-chloropivalamide was prepared by adding dropwise, at room temperature, a solution of 3-chloropivaloyl chloride (1.0 eq., 22.4 g, 0.14 mol) in $CH_2Cl_2$ (100 mL) to a stirred mixture of 2-aminoethanol (2.0 eq., 17.6 g, 0.29 mol) in $CH_2Cl_2$ (300 mL) over a period of one (1) hour. This mixture was allowed to auto-reflux for twenty (20) minutes and was then stirred for an additional forty (40) minutes. The whitish-yellow precipitate that formed was gravity filtered, and the resulting yellow solution was concentrated under vacuum. The resulting viscous yellow oil (23 g, 89% yield) was pure N-(2-hydroxyethyl)-3-chloropivalamide, as evidenced by $^1$H NMR ($CDCl_3$): δ1.31 (s, 6H, $CH_3$, $CH_3$), 3.44 (q, 2H, $CH_2$—NH), 3.61 (s, 2H, $CH_2$—Cl), 3.73 (t, 2H, $CH_2$—OH), 6.3 (br s, 1H, NH).

The resultant N-(2-hydroxyethyl)-3-chloropivalamide was then converted to N-(2-chloroethyl)-3-chloropivalamide by adding dropwise, at room temperature, $SOCl_2$ (1.5 eq., 5 g, 0.042 mol) to a stirred mixture of N-(2-hydroxyethyl)-3-chloropivalamide (1.0 eq., 5 g, 0.028 mol) in toluene (100 mL) over a period of 0.5 hours. This mixture was refluxed for two (2) hours and then concentrated by distilling off all solvents. The resultant dark brown oil was purified by Kugelrohr distillation (<1 mm, 185° C.) to yield 3.4 grams of a pure yellow oil (62% yield) as evidenced by $^1$H NMR ($CDCl_3$): δ1.31 (s, 6H$CH_3$, $CH_3$), 3.62 (overlapping s, 6H, $CH_2$—NH, $CH_2$—Cl, $CH_2$—Cl), 6.21 (br s, 1H, NH).

From the N-(2-chloroethyl)-3-chloropivalamide, the desired 2-(1,1-dimethyl-2-chloroethyl)-2-oxazoline was produced by adding solid NaOH (1.1 eq., 3.5 g, 0.088 mol) to a stirred mixture of N-(2-chloroethyl)-3-chloropivalamide (1.0 eq., 15.7 g, 0.08 mol) in ethanol (300 mL) at room temperature. The mixture was refluxed for two (2) hours, partially concentrated under vacuum, diluted with $H_2O$ (100 mL) and extracted with $Et_2O$ (3×100 mL). The organic layer was dried over $Na_2SO_4$, filtered, and concentrated to a dark brown oil. After purification by vacuum distillation (<1 mm, 130–140° C.), a colorless oil resulted (8.2 g, 64%). This oil was the desired 2-(1,1-dimethyl-2-chloroethyl)-2-oxazoline (herein $C_7H_{12}ClNO$) as evidenced by $^1$H NMR ($CDCl_3$): δ1.31 (s, 6H, $CH_3$, $CH_3$), 3.61 (overlapping s, 2H, $CH_2$—Cl), 3.85 (t, 2H, $CH_2$—NH), 4.25 (t, 2H, $CH_2$—O).

2-(1,1-dimethyl-2-chloroethyl)-4,4-dimethyl-2-oxazoline was prepared as follows. Initially, N-(2-hydroxy-1,1-dimethylethyl)-3-chloropivalamide was prepared by adding dropwise, at room temperature, a solution of 3-chloropivaloyl chloride (1.0 eq., 56 g, 0.36 mol) in $CHCl_3$ (100 mL) to a stirred mixture of 2-amino-2-methyl-1-propanol (2.0 eq., 64.4 g, 0.72 mol) in $CHCl_3$ (300 mL) over a period of one (1) hour. This mixture was allowed to auto-reflux for twenty (20) minutes and was then stirred overnight. The whitish-yellow precipitate that formed was gravity filtered, and the resulting yellow-brown solution was concentrated and purified by vacuum distillation (140–150° C., 1 mm Hg). The resulting yellow oil (61 g, 81%) was pure N-(2-hydroxy-1,1-dimethylethyl)-3-chloropivalamide as evidenced by $^1$H NMR ($CDCl_3$): δ1.13 (s, 6H, $CH_3$, $CH_3$), 1.30 (s, 6H, $CH_3$, $CH_3$), 2.2 (br s, 1H, OH), 3.3 (s, 2H, $CH_2$,—Cl), 3.6 (s, 2$CH_2$—OH), 5.78 (br s, 1H, NH).

The resultant N-(2-hydroxy-1,1-dimethylethyl)-3-chloropivalamide was then converted to 2-(1,1-dimethyl-2-chloroethyl)-4,4-dimethyl-2-oxazoline by adding dropwise, at room temperature, $SOCl_2$ (1.1 eq., 39 g, 0.32 mol) to a stirred mixture of N-(2-hydroxy-1-dimethylethyl)-3-chloropivalamide (1.0 eq., 61 g, 0.29 mol) in toluene (400 mL) over a period of 1.5 hours. This mixture was refluxed during the $SOCl_2$ addition and then concentrated by distilling off all solvents. Without purification, the dark drown oil was dissolved in ethanol (400 mL) and treated with solid NaOH (13.5 g, 0.34 mol). The mixture was refluxed for 1.5 h, cooled, diluted with $H_2O$ (100 mL) and extracted with $Et_2O$ (3×100 mL). The organic layer was dried over $Na_2SO_4$, filtered and concentrated to a dark brown oil. After purification by vacuum distillation (<1 mm, 70–80° C.), a colorless oil resulted (37 g, 67%). This oil was the desired 2-(1,1-dimethyl-2-chloroethyl)-4,4-dimethyl-2-oxazoline (herein $C_9H_{16}ClNO$) as evidenced by $^1H$ NMR ($CDCl_3$): δ1.26 (s, 6H, $CH_3$, $CH_3$), 1.29 (s, 6H, $CH_3$, $CH_3$), 3.6 (s, 2H, $CH_2$—Cl), 3.9 (s, 2H, $CH_2$—O).

II: Functionalizing Styrene Butadiene Rubber with Oxazoline

Styrene/butadiene polymers having a lithium atom at their living ends (SBR-Li) were terminated with 2-(1-chloro-2,2-dimethyl)ethyl-2-oxazoline and 2-(1-chloro-2,2-dimethyl)ethyl-4,4-dimethyl-2-oxazoline.

The living lithium polymer, SBR-Li, was prepared by the randomized copolymerization of styrene and butadiene using n-BuLi initiator. A 5-gallon reactor was charged with hexane solvents (5.8 lb.), a styrene/hexane blend (34%, 32 lb.), and 1,3-butadiene/hexane blend (21.7%, 16 lb.). The reactor was then heated, in batch mode, to 122° F. and, once stabilized, an oligomeric oxolanyl propane polar randomizer (0.2 eq.) (OOPS) and BuLi (1.6 M, 8.5 mL) were added. The reaction temperature peaked at 160° F. within twenty (20) minutes and, thereafter, the reaction was stirred for an additional 0.5 hours. The living polymer cement was transferred under $N_2$ pressure to eight (8) oven-dried, $N_2$-purged bottles with Viton liners and crimped caps. After charging 0.8 equivalents of a polar randomizer (OOPS) the 2-(1-chloro-2,2-dimethyl)ethyl-2-oxazoline ($C_7H_{12}ClNO$; 0.8 eq.) or 2-(1-chloro-2,2-dimethyl)ethyl4,4-dimethyl-2-oxazoline ($C_9H_{16}ClNO$; 0.8 eq.) was charged to some of the bottles and agitated at about 120° F. for thirty (30) minutes. Of the eight (8) bottles, three (3) were charged with $C_7H_{12}ClNO$, two (2) were charged with $C_9H_{16}ClNO$, and three were terminated directly with isopropanol (IPA). The cement in the bottles treated with oxazoline compounds were further treated with IPA, coagulated, and drum-dried.

The three (3) bottles terminated directly with IPA were isolated and drum-dried for use as controls.

III: Characterization of Oxazoline-terminated Polymers

Oxazoline treated polymers were prepared as described above with a molecular weight of about 20,000 g/mol. GPC data showed a high Mn coupled peak comprising 38% of the polymer. Proton NMR data showed the presence of the terminator.

Table 1 provides some physical properties for each of the samples prepared in the experiment described hereinabove. The control samples are sample nos. 1–3. Sample 4, sample 5, and sample 6 are polymers terminated with $C_7H_{12}ClNO$, and sample 7 and sample 8 are polymers terminated with $C_9H_{16}ClNO$. The control polymers and oxazoline-terminated polymers of each of these samples were compounded as indicated in Table 2. Particularly, sample 1 and sample 4 were each compounded according to formula 2, wherein the 70 parts by weight SBR designates the amount of the control or oxazoline-terminated polymer employed (as the case may be). Similarly, sample 2, sample 3, sample 5, sample 6, sample 7, and sample 8 were compounded according to formula 1.

The characteristics of the various compounded rubbers after vulcanization are provided in Table 3. Therein, it will be appreciated that the tan δ values for the oxazoline-terminated polymers compounded with carbon black and other additives are significantly less than the control samples.

Example II

I: Functionalizing Styrene Butadiene Rubber with Poly(2-isopropenyl-2-oxazoline)

Styrene/butadiene polymers having a lithium atom at their living end (SBR-Li) were further reacted with 2-isopropenyl-2-oxazoline (herein IPO) to give a block of poly(IPO) as the end group.

The living polymer, SBR-Li, was prepared by the copolymerization of styrene and butadiene using n-BuLi initiator (1.45 M, 0.8 moles). The living polymer cement was transferred under $N_2$ pressure to two (2) oven-dried, $N_2$-purged bottles. In the first bottle, the living polymer cement was terminated directly with IPA (Sample 9). In the second bottle, the living polymer cement was terminated with IPO (Sample 10) (13.8 mmoles). Physical characterization properties of the resultant functionalized styrene butadiene rubbers are shown in Table IV.

The terminated polymers described above were then compounded according to formula 3 of Table II, and measurements of tan δ were recorded. The results of the tan δ measurements can be seen in Table V. Notably, the tan δ of the IPO-terminated rubber was over 25% less than the control.

TABLE I

SBR Polymer Compositions

| Polymer Type | Control (Bu-SBR-H) | | | (Bu-SBR-$C_7H_{12}ClNO$) | | | (Bu-SBR-$C_9H_{16}ClNO$) | |
| --- | --- | --- | --- | --- | --- | --- | --- | --- |
| Sample | 1 | 2 | 3 | 4 | 5 | 6 | 7 | 8 |
| Base Mn (kg/mole) | 139 | 142 | 145 | 167 | 170 | 188 | 179 | 147 |
| Base Mw/Mn | — | 1.08 | 1.09 | 1.29 | 1.20 | 1.24 | 1.23 | 1.19 |
| Raw ML1/4 (100° C.) | 30.5 | 29.2 | 30.6 | 64.3 | 54.6 | 66.1 | 60.3 | 40.1 |
| Tg (° C.) | −50.2 | −48.2 | −42 | −50.8 | −48.6 | −42.1 | −49.1 | 41.8 |
| % Styrene | — | 23.0 | 20.5 | — | 23.0 | 20.5 | 23.0 | 20.5 |
| % 1,2 Bd (Bd = 100) | — | 37.1 | 32.1 | — | 37.1 | 32.1 | 37.1 | 32.1 |

TABLE II

Sample Rubber Compositions

|  | Formula 1 | Formula 2 | Formula 3 |
| --- | --- | --- | --- |
| Natural Rubber | 30 | 30 | — |
| SBR (Table I) | 70 | 70 | 100 |
| Carbon Black | 41 | 41 | 60 |
| Wax | 1 | 1 | — |
| Naphthenic Oil | — | 5.25 | — |
| Aromatic Oil | 10.5 | 5.25 | 25 |
| Zinc Oxide | 2.5 | 2.5 | 4 |
| Stearic Acid | 2 | 2 | 2 |
| Antioxidant | 0.95 | 0.95 | 1.0 |
| Sulfur | 1.3 | 1.3 | 1.8 |
| CBS | 1.7 | 1.7 | — |
| DPG | 0.2 | 0.2 | — |
| TBBS | — | — | 1.0 |

TABLE III

Characteristics of SBR Compounds

| Polymer Type | Bu-SBR-H | | | Bu-SBR-$C_7C_{12}$ClNO | | | Bu-SBR-$C_9C_{16}$ClNO | |
|---|---|---|---|---|---|---|---|---|
| Sample # | 1 | 2 | 3 | 4 | 5 | 6 | 7 | 8 |
| Formula (Table II) | 2 | 1 | 1 | 2 | 1 | 1 | 1 | 1 |
| Surfanalyzer D.I. (Final)* | 96.9 | 97.6 | 98.1 | 96.0 | 95.9 | 95.6 | 95.4 | 97.4 |
| $MDRt_{50}$ (min) | 2.4 | 2.69 | 2.63 | 2.3 | 2.64 | 2.61 | 2.68 | 2.63 |
| ML1+4 (130° C.) | 30.6 | 31.4 | 30.4 | 39.3 | 41.7 | 45.4 | 43.7 | 35.7 |
| Stress Strain @ 23° C. | | | | | | | | |
| 50% Modulus (psi) | 167 | 275 | 167 | 158 | 164 | 174 | 170 | 174 |
| 300% Modulus (psi) | 1106 | 1971 | 1035 | 1160 | 1196 | 1164 | 1240 | 1124 |
| Tensile Strength (psi) | 2754 | 4042 | 2390 | 3116 | 2467 | 2567 | 2415 | 2416 |
| Elongation (%) | 533 | 481 | 518 | 549 | 475 | 491 | 458 | 488.6 |
| Stress Strain @ 100° C. | | | | | | | | |
| 50% Modulus (psi) | 135 | 139 | 128 | 123 | 124 | 129 | 121 | 130 |
| 300% Modulus (psi) | — | 996 | 817 | 947 | 935 | 902 | 916 | 876 |
| Tensile Strength (psi) | 1005 | 1217 | 1269 | 1178 | 1211 | 1193 | 1147 | 1334 |
| Elongation (%) | 316 | 346 | 405 | 345 | 358 | 360 | 349 | 398 |
| Ring Tear @ 23° C. (lb/in) | 307 | 487 | 373 | 384 | 482 | 334 | 506 | 308 |
| Ring Tear @ 171° C. (lb/in) | 160 | 198 | 173 | 172 | 196 | 178 | 190 | 184 |
| Shore "A" Hardness, 25° C. | 57.7 | 63.5 | 60.4 | 55.3 | 62.0 | 57.9 | 61.1 | 59.9 |
| Dynastat 1Hz | | | | | | | | |
| 25° C. tan δ | 0.198 | 0.202 | 0.218 | 0.135 | 0.166 | 0.149 | 0.148 | 0.187 |
| 50° C. tan δ | 0.164 | 0.164 | 0.178 | 0.109 | 0.133 | 0.115 | 0.118 | 0.150 |
| Lambourn Index | 100 | 100 | 100 | 102 | 101 | 101 | 101 | 98.4 |

*Carbon black dispersion index measured on the cured stock

TABLE IV

Physical Characteristics

| Sample No. | Bu-SBR-H 9 (Control) | Bu-SBR-IPO 10 |
|---|---|---|
| Base Mn (GPC) (kg/mol) | 117.4 | 107.1 |
| Base MWD (Mw/Mn) | 1.55 | 1.77 |
| IPO/Li | — | 17.25 |

TABLE V

Characteristics of Compounded Rubber Composition Containing Bu-SBR-IPO (Formula 3 from TABLE II)

| Sample # | 9 | 10 |
|---|---|---|
| Dynastat @ 65° C. & 1 Hz tan δ | 0.222 | 0.164 |
| % reduction of tan δ | — | 26 |

What is claimed is:

1. A method for forming a functionalized polymer comprising the steps of providing a living lithium polymer; and terminating the living lithium polymer with an oxazoline compound according to the following formula (I):

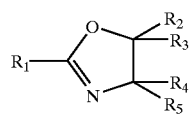
(I)

wherein $R_1$ is selected from the group consisting of:
an organic halide according to the following formula (II):

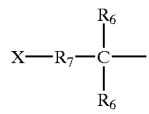
(II)

wherein each $R_6$ may be the same or different and is selected from the group consisting of a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, $R_7$ is selected from the group consisting of a branched or linear $C_1$–$C_{20}$ alkylene moiety, a $C_4$–$C_{20}$ cycloalkylene moiety, and a $C_7$–$C_{20}$ alkylarylene moiety, and X is a halogen;

a branched or unbranched vinyl moiety according to the following formula (III):

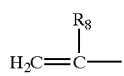
(III)

wherein $R_8$ is selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety;

a moiety according to formula (IV):

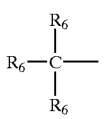
(IV)

wherein each $R_6$ may be the same or different and is selected according to the same criteria set forth in formula (II); and hydrogen; and $R_2$–$R_5$ may be the same or different and are selected from the group consisting of:

hydrogen;

an organic halide, —$R_7$—X, wherein $R_7$ is as already defined; and a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, with the proviso that, if $R_1$ is selected from either an organic halide according to formula (II) or a vinyl moiety according to formula (III), $R_2$–$R_5$ are selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, and, if $R_1$ is selected from either hydrogen or a moiety according to formula (IV), one of $R_2$–$R_5$ is selected from an organic halide —$R_7$—X, and the other $R_2$–$R_5$ groups are selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety.

2. The method according to claim 1, wherein the oxazoline compound is selected according to the following formula:

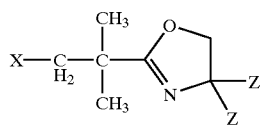

wherein X is a halogen, and each Z is the same and is selected from the group consisting of hydrogen and a methyl group.

3. The method according to claim 2, wherein the oxazoline compound is 2-(1,1-dimethyl-2-chloroethyl)-2-oxazoline according to the following formula:

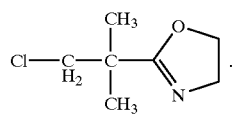

4. The method according to claim 2, wherein the oxazoline compound is 2-(1,1-dimethyl-2-chloroethyl)-4,4-dimethyl-2-oxazoline according to the following formula:

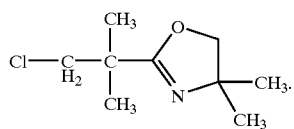

5. The method according to claim 1, wherein the oxazoline compound is 2-isopropenyl-2-oxazoline, as represented by the following formula:

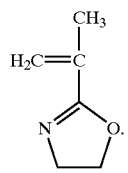

6. The method according to claim 1, wherein the resultant polymer terminated with the oxazoline compound has a molecular weight of about 80,000 to about 300,000 g/mol.

7. A method for producing a compounded rubber article having reduced hysteresis comprising the steps of:

terminating a lithium-initiated rubber with an oxazoline compound; and compounding the terminated rubber with carbon black, wherein the oxazoline compound is selected according to the following formula (I):

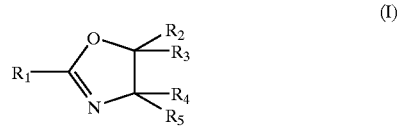

(I)

wherein $R_1$ is selected from the group consisting of:

an organic halide according to the following formula (II):

(II)

wherein each $R_6$ may be the same or different and is selected from the group consisting of a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, $R_7$ is selected from the group consisting of a branched or linear $C_1$–$C_{20}$ alkylene moiety, a $C_4$–$C_{20}$ cycloalkylene moiety, and a $C_7$–$C_{20}$ alkylarylene moiety, and X is a halogen;

a branched or unbranched vinyl moiety according to the following formula (III):

(III)

wherein $R_8$ is selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety;

a moiety according to formula (IV):

(IV)

wherein each $R_6$ may be the same or different and is selected according to the same criteria set forth in formula (II); and hydrogen; and $R_2$–$R_5$ may be the same or different and are selected from the group consisting of:

hydrogen;

an organic halide, —$R_7$—X, wherein $R_7$ is as already defined; and a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, with the proviso that, if $R_1$ is selected from either an organic halide according to formula (II) or a vinyl moiety according to formula (III), $R_2$–$R_5$ are selected from the group consisting of hydrogen, a branched or linear $C_1$–$C_{20}$ alkyl moiety, a $C_3$–$C_{20}$ cycloalkyl moiety, a $C_6$–$C_{20}$ aryl moiety, and a $C_7$–$C_{20}$ alkylaryl moiety, and, if $R_1$ is selected from either hydrogen or a moiety according to formula (IV), one of R₂–R₅ is selected from an organic halide —R₇—X, and the other R₂–R₅ groups are selected from the group consisting of hydrogen, a branched or linear C₁–C₂₀ alkyl moiety, a C₃–C₂₀ cycloalkyl moiety, a C₆–C₂₀ aryl moiety, and a C₇–C₂₀ alkylaryl moiety.

8. The method for producing a compounded rubber article according to claim 7, further including the step of blending the oxazoline-terminated rubber with conventional rubbers.

9. The method for producing a compounded rubber article according to claim 8, wherein the conventional rubber and the oxazoline-terminated rubber are blended such that the oxazoline-terminated rubber makes up from about 1 to about 99 percent by weight of the blend.

10. The method for producing a compounded rubber article according to claim 7, wherein the carbon black is compounded in an amount ranging from about 5 to about 100 parts by weight per 100 parts rubber.

11. A method for producing a compounded rubber article according to claim 7, wherein the oxazoline compound is 2-(1,1-dimethyl-2-chloroethyl)-2-oxazoline according to the following formula:

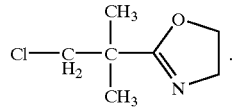

12. A method for producing a compounded rubber article according to claim 7, wherein the oxazoline compound is 2-(1,1-dimethyl-2-chloroethyl)-4,4-dimethyl-2-oxazoline according to the following formula:

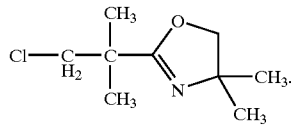

13. A method for producing a compounded rubber article according to claim 7, wherein the oxazoline compound is 2-isopropenyl-2-oxazoline, as represented by the following formula:

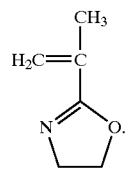

14. A tire having reduced hysteresis comprising:

a rubber compounded with carbon black, wherein the rubber has been terminated with an oxazoline compound selected from the group consisting of:

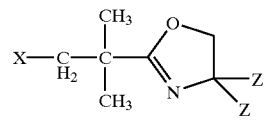

wherein X is a halogen, and each Z is the same and is selected from the group consisting of hydrogen and a methyl group, and

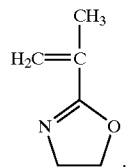

* * * * *